(12) United States Patent
Wang et al.

(10) Patent No.: US 12,111,950 B2
(45) Date of Patent: Oct. 8, 2024

(54) PRIVACY PRESERVING DATA COLLECTION AND ANALYSIS

(71) Applicant: Google LLC, Mountain View, CA (US)

(72) Inventors: Gang Wang, Jersey City, NJ (US); Marcel M. Moti Yung, New york, NY (US); Andres Munoz Medina, Mountain View, CA (US)

(73) Assignee: Google LLC, Mountain View, CA (US)

( * ) Notice: Subject to any disclaimer, the term of this patent is extended or adjusted under 35 U.S.C. 154(b) by 274 days.

(21) Appl. No.: 17/763,492

(22) PCT Filed: Feb. 8, 2021

(86) PCT No.: PCT/US2021/017069
§ 371 (c)(1),
(2) Date: Mar. 24, 2022

(87) PCT Pub. No.: WO2022/015371
PCT Pub. Date: Jan. 20, 2022

(65) Prior Publication Data
US 2022/0374546 A1    Nov. 24, 2022

(30) Foreign Application Priority Data

Jul. 15, 2020 (IL) .......................... 276076

(51) Int. Cl.
*G06F 21/62* (2013.01)
*G06F 16/9535* (2019.01)
*H04L 9/32* (2006.01)

(52) U.S. Cl.
CPC ...... *G06F 21/6245* (2013.01); *G06F 16/9535* (2019.01); *H04L 9/3213* (2013.01)

(58) Field of Classification Search
CPC . G06F 16/9535; G06F 21/6245; H04L 9/3213
See application file for complete search history.

(56) References Cited

U.S. PATENT DOCUMENTS 8,560,558 B2 * 10/2013 Watanabe ........... G06F 16/2255
707/756
10,218,567 B2 * 2/2019 Kuscher .................... G06F 8/71
(Continued)

FOREIGN PATENT DOCUMENTS

| JP | 2014-033256 | | 2/2014 | |
| JP | 2017-507387 | | 3/2017 | |
| WO | WO-2014020605 A1 * | 2/2014 | ......... G06F 16/2228 |

OTHER PUBLICATIONS

Al-Tariq, Abdullah, et al. "A scalable framework for protecting user identity and access pattern in untrusted Web server using forward secrecy, public key encryption and bloom filter." Concurrency and Computation: Practice and Experience 29.23 (2017) (Year: 2017).*

(Continued)

*Primary Examiner* — Syed A Zaidi
(74) *Attorney, Agent, or Firm* — Fish & Richardson P.C.

(57) ABSTRACT

A method includes receiving, by a data processing apparatus and from a content distribution system, a message comprising a probabilistic data structure representing a set of content items that should not be provided to a user device, content item data for content items available to be provided, and a request to determine whether any content item data is invalid, determining that the content item data for a given content item is invalid because the given content item may be in the set of content items represented by the probabilistic data structure, including removing the content item data for the given content item that was determined to be invalid; and preventing distribution of content items including the given content item.

20 Claims, 5 Drawing Sheets

(56) References Cited

U.S. PATENT DOCUMENTS

| | | | | |
|---|---|---|---|---|
| 10,237,275 | B2* | 3/2019 | Huang | H04W 12/50 |
| 11,347,808 | B1* | 5/2022 | Plenderleith | G06F 16/2455 |
| 2006/0294311 | A1* | 12/2006 | Fu | G06F 16/951 |
| | | | | 707/999.1 |
| 2014/0108435 | A1* | 4/2014 | Kolesnikov | G06F 16/245 |
| | | | | 707/754 |
| 2015/0178769 | A1 | 6/2015 | Mirisola et al. | |
| 2016/0092699 | A1 | 3/2016 | Riva et al. | |
| 2018/0248687 | A1* | 8/2018 | Wassenberg | H04L 9/3242 |
| 2018/0302435 | A1* | 10/2018 | Koster | H04L 43/0876 |
| 2020/0027132 | A1 | 1/2020 | Segalov et al. | |
| 2021/0174419 | A1* | 6/2021 | Van De Woestyne | |
| | | | | G06Q 10/087 |

OTHER PUBLICATIONS

Bellovin, Steven Michael, and William R. Cheswick. "Privacy-enhanced searches using encrypted bloom filters." (2007) (Year: 2007).*

NPL Search Terms (Year: 2024).*

Bellovin et al., "Privacy-enhanced searches using encrypted bloom filters" 2007, 16 pages.

Felten, "Privacy by design: frequency capping," https://www.ftc.gov/news-events/blogs/techftc/2012/07/privacy-design-frequency-capping, submitted on Sep. 21, 2015, 7 pages.

International Search Report and Written Opinion in International Appln. No. PCT/US2021/017069, dated Apr. 29, 2021, 18 pages.

Office Action in Indian Appln. No. 202227017918, dated Mar. 1, 2023, 7 pages (with English translation).

Office Action in European Appln. No. 21708888.9, dated Nov. 30, 2022, 11 pages.

Notice of Allowance in Japanese Appln. No. 2022-523695, dated May 22, 2023, 5 pages (with English translation).

International Preliminary Report on Patentability in International Appln. No. PCT/US2021/017069, mailed on Jan. 26, 2023, 11 pages.

Office Action in Israel Appln. No. 276076, dated Feb. 7, 2023, 4 pages.

Office Action in European Appln. No. 21708888.9, mailed on Nov. 13, 2023, 15 pages.

Wikipedia [online], "Cryptographic Hash Function" Feb. 9, 2010, retrieved on Feb. 11, 2023, via Internet Archive: Wayback Machine URL<http://web.archive.org/web/20100209202949/https://en.wikipedia.org/wiki/Cryptographic_hash_function>, 5 pages.

Wikipedia [online], "Cryptography" Feb. 9, 2010, retrieved on Feb. 11, 2023, via Internet Archive: Wayback Machine URL<http://web.archive.org/web/20100209203004/https://en.wikipedia.org/wiki/Cryptography>, 7 pages.

Wikipedia [online], "Information Security" Feb. 9, 2010, retrieved on Feb. 11, 2023, via Internet Archive: Wayback Machine URL<http://web.archive.org/web/20100209012651/https://en.wikipedia.org/wiki/Information_security>, 13 pages.

Office Action in European Appln. No. 21708888.9, mailed on Apr. 11, 2024, 18 pages.

Office Action in Indian Appln. No. 202227017918, mailed on Mar. 20, 2024, 4 pages (with English translation).

Wikipedia.org [online], "HMAC" Feb. 10, 2010, retrieved on May 22, 2024, via Internet Archive: Wayback Machine URL <https://web.archive.org/web/20100210054532/http:/en.wikipedia.org/wiki/HMAC>, 4 pages.

* cited by examiner

PRIVACY PRESERVING DATA COLLECTION AND ANALYSIS

CROSS-REFERENCE TO RELATED APPLICATIONS

This application is a National Stage Application under 35 U.S.C. § 371 and claims the benefit of International Application No. PCT/US2021/017069, filed Feb. 8, 2021, which claims priority to IL Application No. 276076, filed Jul. 15, 2020, entitled PRIVACY PRESERVING DATA COLLECTION AND ANALYSIS. The disclosures of the foregoing applications are incorporated herein by reference in their entirety.

BACKGROUND

This specification relates to data processing and preserving user privacy when collecting and analyzing user data for the purposes of improving user experience.

SUMMARY

In general, one innovative aspect of the subject matter described in this specification can be embodied in a method that includes receiving, by a data processing apparatus and from a content distribution system, a message that includes a probabilistic data structure representing a set of content items that should not be provided to a user device, content item data for content items available to be provided to the user device, and a request to determine whether any content item data is invalid based on the probabilistic data structure, determining, for a given content item among the content items and by the data processing apparatus using the probabilistic data structure, that the content item data for the given content item is invalid because the given content item may be in the set of content items that should not be provided to the user device represented by the probabilistic data structure, including: removing, by the data processing apparatus and from the content item data, the content item data for the given content item that was determined to be invalid, and preventing, by the data processing apparatus, distribution of a set of one or more content items that includes the given content item in response to a request to provide content to the user device.

In some implementations, determining that the content item data for the given content item is invalid because the given content item may be in the set of content items that should not be provided to the user device represented by the probabilistic data structure further includes: querying, by the data processing apparatus, the probabilistic data structure that provides the set of content items that should not be presented to a user device and the content items may be presented to the user device, and the data processing apparatus is a server independent from the content distribution system and content providers that provide (i) the set of content items that should not be provided to a user device and (ii) the content items available to be provided to the user device.

In some implementations, the method further includes decrypting, by the data processing apparatus and using a private key held only by the data processing apparatus, the probabilistic data structure, where the probabilistic data structure was encrypted using a public key corresponding to the private key.

In some implementations, the probabilistic data structure is a bloom filter that is specific to one of: the user device, a web page, a publisher's website, or a request to provide content to the user device.

In some implementations, the set of content items that should not be provided to a user device represented by the probabilistic data structure comprises a union of a first set of content items that should not be provided to a user device and a second set of content items that were randomly selected.

In some implementations, preventing distribution of a set of content items includes refraining from providing content items having a specified type of content to the user.

In some implementations, the content item data for each of the content items comprises a globally unique identifier generated using a hash function based on at least one of: a domain of the content provider, the content item identifier unique within each content provider, the content provider's secret key, the browser's public key generated by trust token.

Other embodiments of this aspect include corresponding systems, apparatus, and computer programs, configured to perform the actions of the methods, encoded on computer storage devices.

Collecting and analyzing user data can be beneficial for content providers and distribution systems in the context of improving user experiences. However, providers may generally not be able to retain the data in a form sufficient to perform their analyses while providing sufficient privacy protection. The following description discusses various techniques and systems for preserving user privacy with respect to data collected from users, while still maintaining the data in a form that allows providers to perform the analyses that are used to determine whether or how to adjust the distribution of content to users or modify content to provide a customized user experience.

Particular embodiments of the subject matter described in this specification can be implemented to realize one or more of the following advantages. For example, the system can transmit a probabilistic data structure that masks user data, providing only the minimal amount of information to content providers and distributors required to distribute content. The solutions described in this specification also reduce privacy risks associated with storing raw user data (e.g., data leaks or unauthorized access to user data). Conventionally, a provider may store user data in its raw form, but such raw data storage is susceptible to unauthorized access. For instance, if a malicious party gains access to the provider's systems, the raw user data stored in such systems may be readily accessible. The solutions described herein reduce this risk by inserting a privacy-enhanced representation of the user data, such as a hash representation of the user data, into a probabilistic data structure that further masks the user data. More specifically, the combination of using hashed representations of the user data in combination with a probabilistic data structure not only masks the data itself (e.g., using the hash representation rather than the actual user data), but also masks the number of users that have a specific set of user data, thereby providing enhanced data privacy protection. This is because probabilistic data structures, upon being queried, may identify a number of entries that actually match the query (i.e., true positives) as well as entries that do not match the query (i.e., false positives). Thus, even if a malicious party can access the probabilistic data structure, the malicious party cannot discern with any certainty the user data stored in this data structure, or even the actual number of users that have a specified combination of user attributes. This is because the probabilistic data structure reveals the likelihood or probability that certain user data is present in the probabilistic data structure.

On the other hand, the system is able to accurately perform its analysis using the data without direct access to the specific user's data. In some implementations, the independent server can be the server of a content provider or part of a content distribution system. For example, for a probabilistic data structure that stores the number of times that a content item has been shown to the user, the independent server does not know which entries correspond to a particular user. Furthermore, because the probabilistic data structure allows the independent server to analyze the content distribution data, the independent server does not need to access or store the user data in its raw format, thereby further reducing the likelihood of a data leak revealing identifiable user data. Relatedly, the innovations described in this specification allow significant resource savings (e.g., reduced utilization of bandwidth and reduced utilization of memory resources) by allowing the provider to discard raw user data (which can consume significant amount of resources) and instead store a privacy-enhanced representation of this data in the probabilistic data structure, which requires much fewer resources. The probabilistic structure requires fewer resources because the structure stores a representation of the data that is much smaller than the raw data itself. Thus, using the probabilistic data structure reduces resources required not only in storage, but also in transmitting the data. For example, the probabilistic structure requires less data to be transferred or stored relative to transferring or storing the raw data, allowing the transmission and storage of the data represented by the probabilistic structure to be faster and more efficient.

In addition to the probabilistic structure in which data is stored, the solutions described within apply further layers of protection to the user data, including public and private key encryption at an individual browser or operating system (OS) level. By using a specific key for each browser, the invention disincentivizes malicious parties from attempting to recreate user data due to the scale at which the malicious parties would need to operate to infer the encrypted data—each browser would need to be targeted on an individual level to collect encrypted, probabilistic data, which would then need to be decrypted and analyzed. Furthermore, because data is associated with a particular browser or OS, attempts to hijack multiple browsers with a replicated browser-specific key can easily be detected through traffic analysis and stopped.

The privacy preserving techniques described below facilitate providing a consistent user experience across platforms maintained by separate entities having access to different data of different types and/or directed to different categories of content. By allowing providers to access only the minimum amount of data required for a consistent browsing experience, the techniques preserve a user's privacy while maintaining a content delivery experience that users have come to expect.

By reducing or eliminating entirely the distribution of content to an entity that has already seen the content or has indicated disinterest in being presented with the content, the method reduces the amount of resources expended distributing content to an entity that is unlikely to engage with the content and more efficiently provide content across a network—the method prevents the distribution of content to an entity that is not actually viewing the content. In other words, the computing resources, such as network bandwidth, processor cycles, and/or allocated memory, are not wasted by using these resources to distribute content to entities that are not actually interested in viewing the content.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
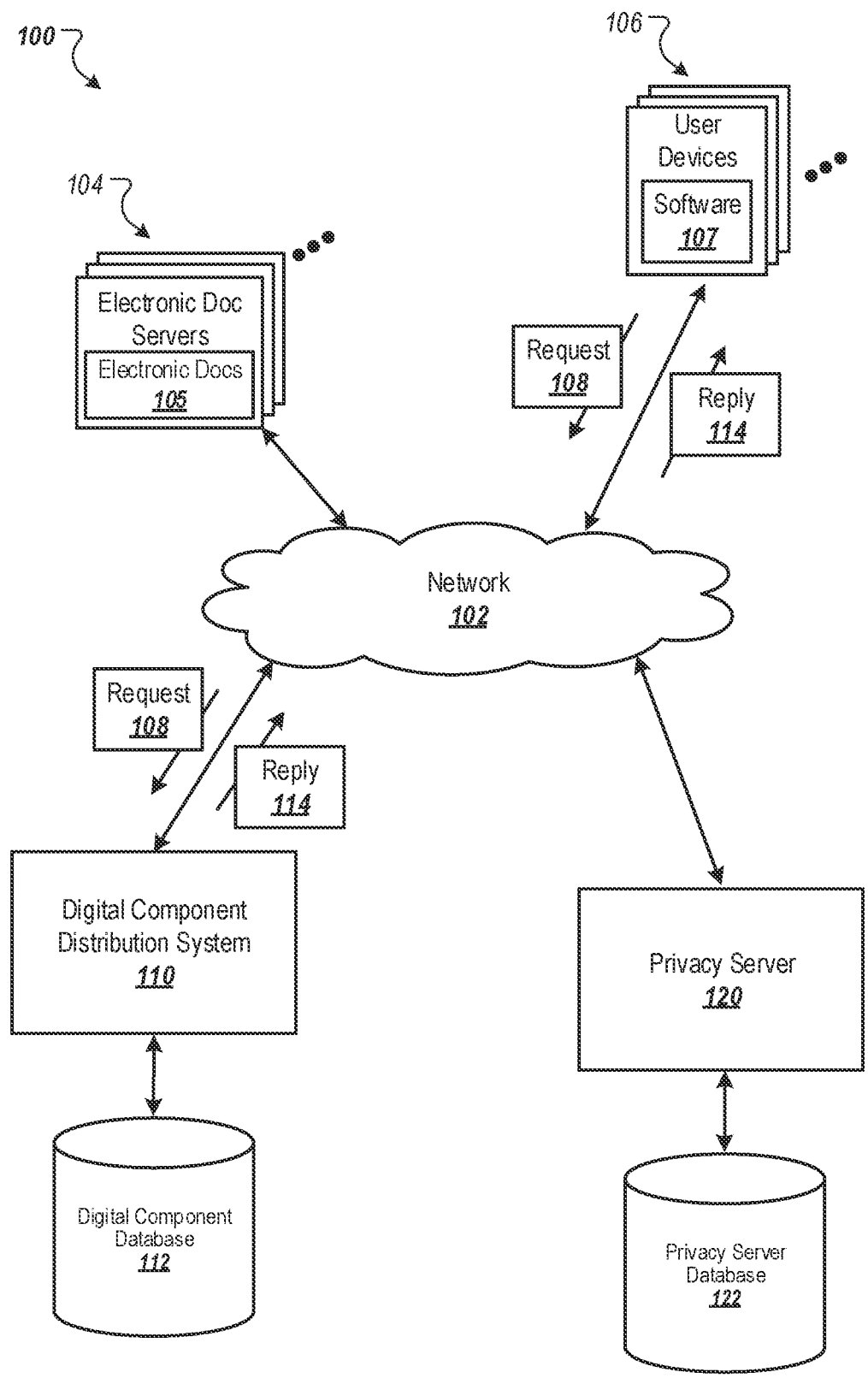
FIG. 1 is a block diagram of an example environment for privacy preserving data collection and analysis.

This disclosure relates to computer implemented methods and systems that preserve user privacy when collecting and analyzing user data.

Through the exchange of information and transactions between users and providers, providers may receive significant amount of user data, such as, for example, the types of content that the user accesses, when the user last accessed the provider's website, and other information related to the user's interactions with the provider and/or the provider's website. If users allow the provider to collect such user data, the providers can analyze this data to improve the provider's operations and/or improve user experience. For example, providers may use user data to identify the types of content most viewed by the user and provide additional information related to those types of content while preventing distribution of information about other types of content in which the user has not demonstrated interest. For purposes of the description herein, "content" refers to digital content, including third party content provided by content providers. A content item refers to a particular piece of content, and includes digital components for presentation with other content requested by a user.

A growing number of users wishing to preserve their privacy revoke providers' access to such activity data (e.g., by declining to accept third-party cookies) but expect a similar level of control over (or personalization of) their user experience. For example, users generally prefer to not be continually shown the same third party content as they navigate across multiple different websites, such that continually distributing the same third-party content to the same user across multiple different websites results in wasted computing resources that are used to distribute content that the user does not want to see, and will likely ignore. One way to limit the number of times a particular user is exposed to the same third-party content is to utilize frequency control techniques that prevent the same user from being exposed to the same third-party content more than a specified number of times.

Existing methods of providing users with control over their browsing experience regarding the frequency with which certain content items are provided to a user rely on users providing access to user information in order to determine whether a user has indicated that a certain content item or category of content is not interesting to them such that the user can indicate that they would not like to see this content or category of content again, or whether a particular content item has been provided to the user a threshold number of times such that the user can indicate that they have seen the content too many times, or too many times within a period of time. For example, existing methods of frequency capping rely on, for example, users accepting cookies, agreeing to provide access to a device ID, or signing in to an account. Without access to this user data, some methods of frequency control may not be effective, or may not be effective across different platforms. The innovations described in this specification overcome the problems of existing methods of implementing frequency control, improving user experience while preserving user privacy and reducing wasted computing resources (e.g., used to distribute unwanted content to users).

As described in detail throughout this specification, these innovative techniques can preserve user privacy with respect to data collected from users, while maintaining the data in a form that allows a system to perform analyses on the user data. Upon receiving user data specifying one or more attributes, a browser, OS, or other software on a user device generates a privacy-enhanced representation of the user data using, for example, one or more hash functions. For example, a server such as a content provider server or an independent server receives and stores the privacy-enhanced representation of the user data in the probabilistic data structure in which it was received. In some implementations, the independent server may never receive the raw data but the probabilistic data structure, or receive the raw data, construct the probabilistic data structure, and then discard the raw user data, thereby preventing direct access to that data even if an unauthorized third party gained access to the system, and maintaining the information from the raw user data in a more compact and efficient form.

As used throughout this document, the phrase "false positive rate" refers to a value that identifies the expected rate or number of false positives associated with a probabilistic data structure. The false positive rate may be, for example, a function of the number of items inserted into the probabilistic data structure and the size of the probabilistic data structure.

Further to the descriptions throughout this document, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

FIG. 1 is a block diagram of an example environment 100 for privacy preserving data collection and analysis. The example environment 100 includes a network 102, such as a local area network (LAN), a wide area network (WAN), the Internet, or a combination thereof. The network 102 connects electronic document servers 104 ("Electronic Doc Servers"), user devices 106, a digital component distribution system 110 (also referred to as DCDS 110), and a privacy server 120. The example environment 100 may include many different electronic document servers 104 and user devices 106.

A user device 106 is an electronic device that is capable of requesting and receiving resources (e.g., electronic documents) over the network 102. Example user devices 106 include personal computers, wearable devices, smart speakers, tablet devices, mobile communication devices (e.g., smart phones), smart appliances, and other devices that can send and receive data over the network 102. In some implementations, the user device can include a speaker that outputs audible information to a user, and a microphone that accepts audible input (e.g., spoken word input) from the user. The user device can also include a digital assistant that provides an interactive voice interface for submitting input and/or receiving output provided responsive to the input. The user device can also include a display to present visual information (e.g., text, images, and/or video). A user device 106 typically includes a user application, such as a web browser, to facilitate the sending and receiving of data over the network 102, but native applications executed by the user device 106 can also facilitate the sending and receiving of data over the network 102.

User device 106 includes software 107. Software 107 can be, for example, a browser or an operating system. In some implementations, software 107 allows a user to access information through a network, such as network 102, retrieving information from a server and displaying the information on a display of user device 106. In some implementations, software 107 manages user device 106's hardware and software resources and provides common services for other programs on user device 106. Software 107 can act as an intermediary between programs and user device 106's hardware.

Software 107 is specific to each user device 106. As described in detail below, the privacy preserving data analysis and collection innovations provide a device-specific solution that is resource-efficient and secure.

An electronic document is data that presents a set of content at a user device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents 105 ("Electronic Docs") can be provided to user devices 106 by electronic document servers 104. For example, the electronic document servers 104 can include servers that host publisher websites. In this example, the user device 106 can initiate a request for a given publisher webpage, and the electronic document server 104 that hosts the given publisher webpage can respond to the request by sending machine Hyper-Text Markup Language (HTML) code that initiates presentation of the given webpage at the user device 106.

Electronic documents can include a variety of content. For example, an electronic document 105 can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document. In this example, the given electronic document can include a tag or script that causes the user device 106 to request content from the data source when the given electronic document is processed (e.g., rendered or executed) by a user device 106. The user device 106 integrates the content obtained from the data source into a presentation of the given electronic document to create a composite electronic document including the content obtained from the data source.

In some situations, a given electronic document can include a digital content tag or digital content script that references the DCDS 110. In these situations, the digital content tag or digital content script is executed by the user device 106 when the given electronic document is processed by the user device 106. Execution of the digital content tag or digital content script configures the user device 106 to generate a request 108 for digital content, which is transmitted over the network 102 to the DCDS 110. For example, the digital content tag or digital content script can enable the user device 106 to generate packetized data request including a header and payload data. The request 108 can include data such as a name (or network location) of a server from which the digital content is being requested, a name (or network location) of the requesting device (e.g., the user device 106), and/or information that the DCDS 110 can use to select digital content provided in response to the request. The request 108 is transmitted, by the user device 106, over the network 102 (e.g., a telecommunications network) to a server of the DCDS 110.

The request 108 can include data that specifies the electronic document and characteristics of locations at which digital content can be presented. For example, data that specifies a reference (e.g., URL) to an electronic document (e.g., webpage) in which the digital content will be presented, available locations (e.g., digital content slots) of the electronic documents that are available to present digital content, sizes of the available locations, positions of the available locations within a presentation of the electronic document, and/or media types that are eligible for presentation in the locations can be provided to the DCDS 110. Similarly, data that specifies keywords designated for the selection of the electronic document ("document keywords") or entities (e.g., people, places, or things) that are referenced by the electronic document can also be included in the request 108 (e.g., as payload data) and provided to the DCDS 110 to facilitate identification of digital content items that are eligible for presentation with the electronic document.

Requests 108 can also include data related to other information, such as information that the user has provided, geographic information that indicates a state or region from which the request was submitted, or other information that provides context for the environment in which the digital content will be displayed (e.g., a type of device at which the digital content will be displayed, such as a mobile device or tablet device). User-provided information can include demographic data for a user of the user device 106. For example, demographic information can include age, gender, geographical location, education level, marital status, household income, occupation, hobbies, social media data, and whether the user owns a particular item, among other characteristics.

Data that specifies characteristics of the user device 106 can also be provided in the request 108, such as information that identifies a model of the user device 106, a configuration of the user device 106, or a size (e.g., physical size or resolution) of an electronic display (e.g., touchscreen or desktop monitor) on which the electronic document is presented. Requests 108 can be transmitted, for example, over a packetized network, and the requests 108 themselves can be formatted as packetized data having a header and payload data. The header can specify a destination of the packet and the payload data can include any of the information discussed above.

The DCDS 110 selects digital content that will be presented with the given electronic document in response to receiving the request 108 and/or using information included in the request 108. In some implementations, the DCDS 110 is implemented in a distributed computing system (or environment) that includes, for example, a server and a set of multiple computing devices that are interconnected and identify and distribute digital content in response to requests 108. The set of multiple computing devices operate together to identify a set of digital content that is eligible to be presented in the electronic document from among a corpus of millions or more of available digital content. The millions or more of available digital content can be indexed, for example, in a digital component database 112. Each digital content index entry can reference the corresponding digital content and/or include distribution parameters (e.g., selection criteria) that condition the distribution of the corresponding digital content.

The identification of the eligible digital content can be segmented into multiple tasks that are then assigned among computing devices within the set of multiple computing devices. For example, different computing devices can each analyze a different portion of the digital component database 112 to identify various digital content having distribution parameters that match information included in the request 108.

The DCDS 110 aggregates the results received from the set of multiple computing devices and uses information associated with the aggregated results to select one or more instances of digital content that will be provided in response to the request 108. In turn, the DCDS 110 can generate and transmit, over the network 102, reply data 114 (e.g., digital data representing a reply) that enables the user device 106 to integrate the select set of digital content into the given electronic document, such that the selected set of digital content and the content of the electronic document are presented together at a display of the user device 106.

Privacy server 120 is an optional component of system 100. Privacy server 120 is a server independent of electronic doc servers 104 and/or DCDS 110. Privacy server 120 provides users with control over their browsing experience while preserving users' privacy. Privacy server 120 applies frequency controls to content distribution processes. In some implementations, privacy server 120 is part of digital component distribution system 110. In this document, the term "frequency control" refers to one or more features that control the frequency with which content is presented to a particular user.

For example, frequency control can refer to frequency capping, a feature that allows content providers to limit the number of times that a content item is shown. Frequency capping can be implemented in part by the DCDS 110 and/or privacy server 120 and in part by the user device 106's browser 107. For example, the DCDS 110 and/or privacy server 120 can maintain a record of a maximum threshold number of times that each content item can be shown and/or a time period within which the content item can be shown, and the user device 106's browser 107 can maintain a number of times that a particular content item has been shown. If the browser 107 determines that the maximum threshold number of times has been reached for a particular content item, the content item can be added to a list of content items that should not be served again, or should not be served within a period of time. Frequency capping is important to a user's browsing experience and improving the efficiency of a system, as seeing the same content excessively can be unpleasant or annoying to a user, diminishing their experience and wasting content provider resources in transmitting and presenting the repetitive content item to the user.

In another example, frequency control can refer to a feature that collects input from a user signaling to content providers that a particular content item or category of content is not interesting to them and/or that they do not want to see it again. For example, a user can be presented with the option to stop the content item from being presented to them at that moment and to prevent the content item from being presented to them in the future. The user can interact with a user interface element such as a button, a check box, or other elements. For example, the user can select a button to dismiss the content. Additionally, the user can provide subjective feedback regarding the content when stopping the content from being presented to them. For example, the user can input feedback such as "I've seen this suggestion before," "I don't like this," "Don't show this to me again," among other types of input. In some implementations, this kind of user input can be referred to as "muting" a content item. In some implementations, muting is associated with a period of time. For example, a user can choose a period of time during which they do not wish to see the content item. In some implementations, a default period of time can be applied when a user mutes a content item or a period of time selected based on the type of content item and/or the type of feedback provided by the user, among other factors.

In some implementations, privacy server 120 is implemented in a distributed computing system (or environment) that includes, for example, a server and a set of multiple computing devices that are interconnected and in response to requests to apply frequency control. The set of multiple computing devices operate together to identify a set of digital content that is eligible to be presented in the electronic document from among a corpus of millions or more of available digital content. The millions or more of available digital content can be indexed, for example, in privacy server database 122 according to how many times the content has been presented to a particular user and/or whether a user as requested to not be presented with the content item.

As an initial step, each content item distribution campaign can be represented by a campaign ID that is unique within each content distribution system. A "globally" unique campaign ID allows a content item distribution campaign to be uniquely identified across the entire Internet, and is generated using a combination of the eTLD+1 (one more level than the effective top-level domain) of the content distribution system's domain and the campaign ID for the campaign within the content distribution system's domain. For example, a globally unique campaign ID can be generated as a cryptographic hash of the eTLD+1 of the content distribution system's domain and the campaign ID. One such cryptographic hash can be hash-based message authentication code (HMAC) implemented using a secure hash algorithm such as SHA-256, to create a result of 32 byte words. An example function to calculate a globally unique campaign ID is represented by Equation (1):

$$S_i = \text{HMAC}(\text{campaign\_ID}, \text{content\_distribution\_system\_domain}) \quad \text{Equation (1)}.$$

A finite discrete set of content items is represented by, for example, a set as represented by Equation (2):

$$S = \{S_1, S_2, \ldots, S_z\} \quad \text{Equation (2)}$$

One benefit of defining each globally unique campaign ID using HMAC is that, without additional information, it is impossible to determine the identity of the content distribution system or the campaign ID only by examining the globally unique campaign ID. Thus, the globally unique campaign ID protects confidential information such as the number of content item distribution campaigns currently running, the number of content item distribution campaigns that are stopped, and the number of content item distribution campaigns that have started, among other information.

These globally unique campaign IDs are provided to software running on each user's device as the user of the user device navigates and browses the Internet. For example, software 107 can store data relating to the globally unique campaign IDs. In some implementations, the globally unique campaign IDs are stored locally on the user devices. Software 107 can encompass various software on a user device; for ease of explanation, the following description is provided with respect to a browser program 107 on a user device.

To provide further protection, each content distribution system can generate a secret key. For example, DCDS 110 can generate a secret key DCDS key. For each browser, the content distribution system can create a browser-specific secrete key using its own secret key and a public key for the browser generated by trust token API. For example, DCDS 110 can generate a browser-specific secret key for browser 107 by hashing a public key for the browser browser_public_key and DCDS 110's secret key DCDS key according to Equation (3):

$$\text{browser\_specific\_key} = \text{HMAC}(\text{browser\_public\_key}, \text{DCDS\_key}) \quad \text{Equation (3)}.$$

The content distribution system can then generate a globally unique campaign ID for a content item presented to the browser. In some implementations, the content distribution system can use a deterministic encryption algorithm. For example, DCDS 110 can generate a globally unique campaign ID for a content item presented to browser 107 using a deterministic symmetric encryption algorithm according to Equation (4):

$$S_i = \text{Encrypt}(\text{campaign\_ID}, \text{browser\_specific\_key}) \quad \text{Equation (4)}.$$

Next the content distribution system encrypts $S_i$ and transmits the ciphertext as a parameter included with a request to apply frequency control. In some implementations, the content distribution system can use a probabilistic encryption algorithm. For example, DCDS 110 can encrypt Si according to Equation (5) and transmit the result to browser 107 when invoking frequency control:

$$S_i = \text{PubKeyEncrypt}(S_i, \text{browser\_public\_key}) \quad \text{Equation (5)}.$$

Upon receiving the request to invoke frequency control, the browser can decrypt the request and $S_i$ using its browser-specific private key generated by trust token API. As long as the content distribution system's secret key is kept confidential, malicious parties cannot determine the browser-specific key calculated by Equation (3) even using intercepted traffic. Furthermore, the browser-specific nature of the browser-specific secret key deters malicious parties because there is no scalable or economical way for malicious parties to collect the globally unique campaign IDs S; for purposes of accessing content provider information.

In order to implement frequency control techniques, a script within a content item may notify, for example, the browser on the user device at which the content item is being displayed of (1) the campaign ID with which the content item is associated and (2) any frequency control rules that have been defined for the campaign. For example, a frequency capping rule can be that there should be no more than 2 presentations of the content item per minute, and no more than 5 presentations per hour. The browser can maintain, for each globally unique campaign ID, a data structure that indicates (1) the frequency capping rules and (2) a list of timestamps of when the content item has been presented. In some implementations, the browser can remove timestamps that have occurred at a time in the past beyond the longest timeframe defined in the frequency cap to reduce memory resources required to store and maintain the data. For example, if the frequency cap specifies that there should be no more than 5 presentations per hour, the browser can remove timestamps that have occurred more than one hour ago. The browser can determine a timeframe between two occurrences by finding the difference between the timestamp of the most recent occurrence and the occurrence in question. This data allows the browser to determine, or to facilitate determining whether a campaign has reached its frequency cap on the browser.

Additionally, each browser maintains a set of content items D that should not be presented on the browser. Set D is a subset of the finite, discrete set of content items and should not be presented due to frequency control rules or explicit user request. For example, content items in set D should not be served either because the user of the user device on which the browser is running has provided input indicating they are not interested in the content item or do not wish to see the content item again, or because the user is being presented with the content item too frequently, according to frequency control rules.

The browser can update set D when various conditions occur. For example, the browser can update set D when a user provides feedback indicating that they do not wish to see a content item or are not interested in content like the content item, when content items being presented to the user have reached the frequency cap specified by the frequency control rules, and when the period of time specified by the user's feedback and/or frequency control rules expire. In general, the number of items within set D is far smaller than the number of items within set S such that the number of content items ineligible for presentation to a user due to user preference or frequency control rules is smaller than the number of all content items that are available.

Content distribution systems use a browser-specific set D when selecting a content item, or digital component, for presentation to a particular user of the user device on which the browser is running. For example, a content distribution system can select a content item $S_i$ from set S subject to the condition that $S_i \notin D$ such that the selected content item honors the frequency control rules and user preferences represented by set D.

The set D is advantageous because it allows content distribution systems to honor frequency control rules and provide a user experience according to a user's expectations. However, if direct access to set D is provided to a content provider or to the content distribution system, set D can become a signal that facilitates tracking of a user. To limit any incremental tracking that can be performed using set D, while honoring frequency control rules across various platforms and domains, each browser can expand set D with randomly selected noise. For example, a browser can generate a random set D' representing random content items that are also identified as ineligible for presentation, regardless of whether the items are eligible according to the frequency control rules or user preferences. The browser can then calculate the union of sets D and D' (D∪D') and randomly reshuffle the elements before providing the results with a content item request. The set D' provides random noise that obfuscates the real set of content items that are ineligible, making it difficult or impossible to correlate the set (D∪D') with a particular user. The browsers select D' to provide a particular level of privacy protection while maintaining efficiency such that complexity and adoption cost in terms of computing resources is not prohibitively high.

Browsers can adapt the sets D' based on the situation. A browser can select a set D' for the lifetime of each web page-specific identifier, for each web page visit, for each content item request, and for each program or platform, among others. For example, if a site can correlate the set D' with each content item request from within the same web page visit, the browser can determine that it is most efficient to generate only one set D' for multiple content item requests originating from the same web page visit. To deter web pages from persistently tracking the set D', the browser can insert (D∪D') into the headers of content item requests or encrypt (D∪D') using a public key of a particular server so that only that server can decrypt the message.

In addition to the randomly generated noise, browsers can add a layer of probabilistic protection to user data. For example, a browser can select and construct a bloom filter and transmit the filter along with a content item request to further obfuscate the set D that can be used to track a user. A bloom filter is a space-efficient probabilistic data structure that can quickly check whether an element belongs to a set. The result is either "possibly in set" or "definitely not in set."

Bloom filters can use, for example, fewer than 10 bits per element, providing a false positive rate independent of the size or number of elements in the set as compared to 32 bytes for the hashed set, providing massive savings in terms of storage and bandwidth requirements. Such probabilistic data structures can provide a significant reduction in the utilization of data processing resources and/or memory resources by storing a privacy-enhanced representation of this data in the probabilistic data structure, which requires few resources relative to the raw data, and allowing the raw data to be discarded. Thus, using the probabilistic data structure also reduces the amount of resources needed to process the data. The probabilistic structure requires less data to be transferred and/or stored relative to transferring or storing the raw data, allowing the transmission and storage of the data represented by the probabilistic structure to be faster and more efficient.

Furthermore, if the content distribution system is restricted to presenting content items only if a bloom filter result indicates that the item is "definitely not in set" for the set (D∪D') of ineligible content items, the process guarantees that frequency control limitations are honored. The browsers can use variants of bloom filters or other probabilistic data structures similar to bloom filters. For example, the browsers can use a cuckoo filter. In some implementations, the browsers can evaluate a number of probabilistic structures similar to bloom filters and choose the most appropriate structure.

The probability of a false positive essentially creates a set D" representing an additional set of content items that are also identified as ineligible for presentation, regardless of whether the items are eligible according to the frequency control rules or user preferences. Because the bloom filter replies with "possibly in set" when $S_i \in D \cup D' \cup D''$, the bloom filter further frustrates the possibility of correlating a set ($D \cup D' \cup D''$) with a particular user. The set of content items ineligible for presentation has effectively been randomly expanded twice.

Figure 2:
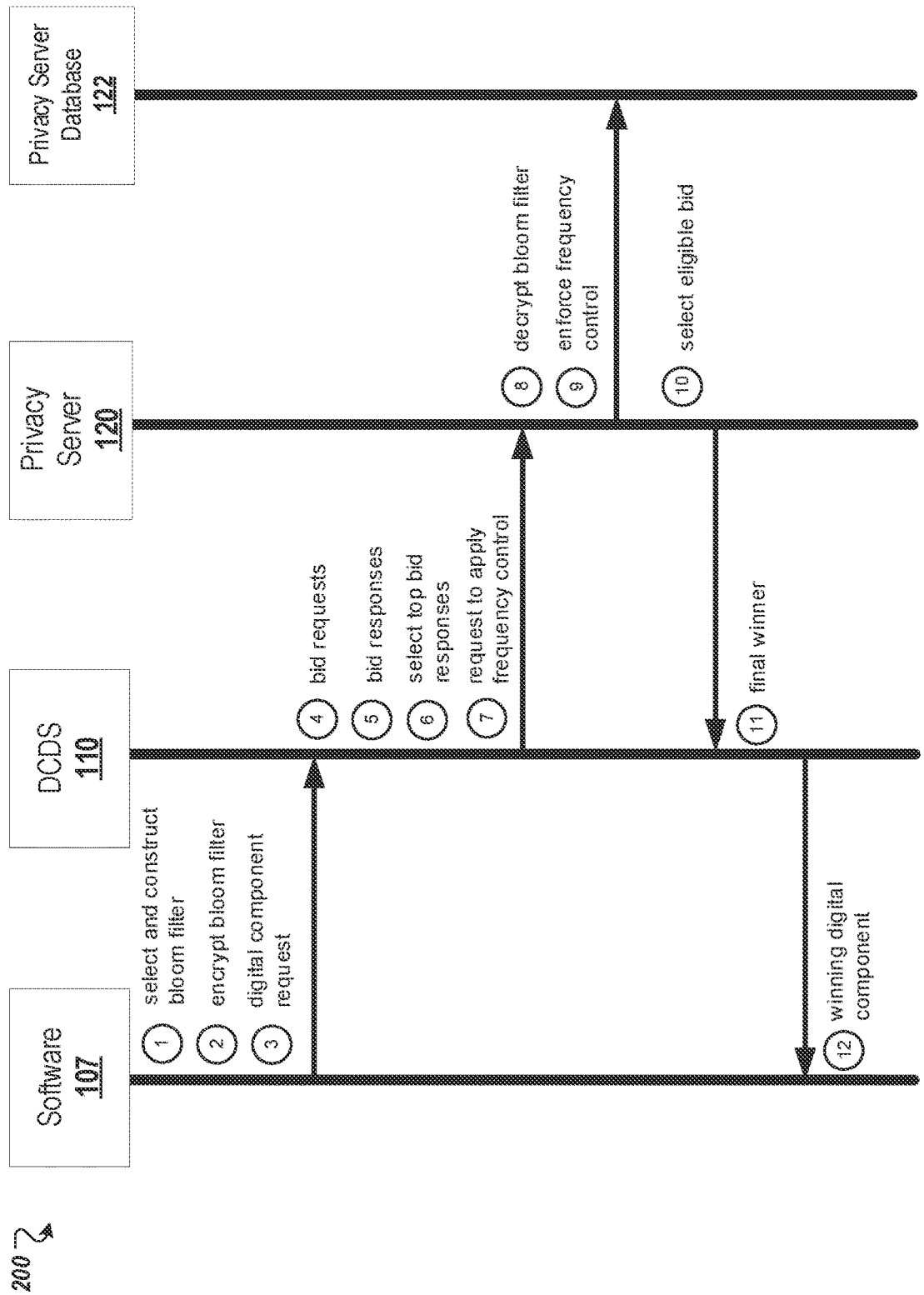
FIG. 2 is a swimlane flow diagram of a privacy preserving method for data collection and analysis.

FIG. 2 is a swimlane flow diagram of a privacy preserving method 200 for data collection and analysis. Operations of method 200 are performed by various components of the system 100. For example, operations of method 200 can be performed by privacy server 120 and DCDS 110 in communication with user devices 106.

The method 200 encapsulates each of the above described privacy and security features, and enables content distribution systems to query a bloom filter and access only the minimum amount of information essential to perform the final selection of a content item for display. Furthermore, the method 200 allows a user who visits different platforms with access to different types of data or sets of data to have a consistent experience with respect to content item provision. For example, method 200 allows a user's privacy expectations to be honored whether the user is visiting a website for browsing user-made items for sale owned and operated by a first entity or a social network platform owned and operated by a second, completely different entity.

The method begins with steps 1-3, which are performed by software of a user device. In step 1, software of a user device selects a bloom filter and constructs the selected bloom filter. For example, browser 107 of user device 106 can determine, based on received interaction data from user device 106, an appropriate bloom filter and bloom filter parameters to enforce the frequency control rules associated with a particular user. Browser 107 can select, for example, a false positive rate for the bloom filter. In some implementations, to amortize the bloom filter construction cost, the browser can optionally cache the constructed bloom filter for later applicable requests. Browser 107 selects the parameters for the bloom filter and constructs the bloom filter without input from parties such as DCDS 110 or content providers.

The method continues with step 2, in which the browser encrypts a message containing the bloom filter using an asymmetric encryption algorithm. Browser 107 composes a message including at least (1) the constructed and/or cached bloom filter and (2) a content item request timestamp that identifies the time at which a content item was requested through user device 106. The browser can encrypt the bloom filter and include the encrypted bloom filter in the message. In some implementations, browser 107 encrypts the bloom filter using privacy server 120's public key such that only privacy server 120 can decrypt the result.

The method continues with step 3, in which the browser generates a request for a digital component for display at the user device. For example, browser 107 can generate a request 108 for a content item for display at user device 106.

The method continues with steps 4-6, which are performed by DCDS 110. In some implementations, steps 4 and 5 occur in parallel for each content provider that participates in DCDS 110.

In step 4, the content distribution system receives the request for the digital component from the browser and generates a bid request, soliciting bids from content providers to provide content to the user device. For example, DCDS 110 receives the request 108 for a content item to display at user device 106. DCDS 110 can then generate a bid request that solicits bids from content providers. In some implementations, DCDS 110 performs an auction process to solicit bid responses. For example, DCDS 110 can perform a standard auction process as commonly used in content distributions systems.

In step 5, the content distribution system receives bid responses from content providers. For example, DCDS 110 receives responses indicating particular content items and associated bid prices from content providers in response to its request for bids to provide content to user device 106. In some implementations, the bids can be provided, for example, including a globally unique campaign ID as described above.

In some implementations, the content providers can return multiple bids in response to the bid request to avoid losing a buying opportunity, because the content providers are not aware of the bloom filter and cannot pre-filter candidate content items based on the frequency control parameters and may return a content item that will be later blocked (for example, the content item may be determined to be ineligible in Step 10).

In step 6, the content distribution system selects a number of top bids from among the bid responses received. For example, DCDS 110 can select the top three highest bids from the standard auction process. In some implementations, DCDS 110 can adjust the number of top bids selected based on the number of responses received, a frequency control parameter, and/or a bloom filter parameter, among other factors.

In step 7, the content distribution system can apply content frequency capping by querying an independent privacy server. For example, DCDS 110 can request that privacy server 120 apply the bloom filter on the auction result by sending a message including at least (1) an ordered list of the selected top bids and (2) the encrypted bloom filter with the content item request timestamp.

The method continues with steps 8-10, performed by the content distribution system and/or independent privacy server in communication with its privacy server database. In some implementations, the independent privacy server 120 is part of the content distribution system and restricts the content distribution system activity such that the content distribution system does not query the same bloom filter repeatedly to gather more information than needed to perform content distribution.

In step 8, the content distribution system and/or privacy server decrypts the received bloom filter. For example, DCDS 110 and/or privacy server 120 can use its private key to decrypt the bloom filter that browser 107 encrypted using DCDS 110's/privacy server 120's public key.

In step 9, which is optional, if the privacy server is independent from the content distribution system, the privacy server enforces the frequency control rules by consulting its privacy server storage using the bloom filter and the content request timestamp. The timestamp can be used to detect potential abuse by the content distribution system. For example, privacy server 120 can determine that a particular bloom filter has been queried more than a threshold number of times by a content distribution system and determine that the content distribution is engaging in suspicious or fraudulent activity.

In step 9, the content distribution system or the privacy server enforces the frequency control rules by querying the bloom filter. For example, DCDS 110 and/or privacy server 120 can determine, using the bloom filter, whether a content item is eligible for display at user device 106. In one example, the frequency control rules include restricting a particular content item from being served more than N times within the past M minutes. DCDS 110 and/or privacy server 120 can determine, for example, that a particular content item indicated by a bid from the list provided by DCDS 110 has been served less than 2 times within the past 25 minutes, and therefore that the particular content item is eligible.

In step 10, the content distribution system and/or privacy server selects the top ranked bid that is still eligible after consulting its database using the bloom filter. For example, privacy server 120 can select the highest bid from the list received in step 7 that remains eligible according to the bloom filter as applied to privacy server database 122.

The method continues with step 11, which is optional, performed by the privacy server. In step 11, the privacy server transmits the selected top ranked bid that is still eligible for display at the user device to the content distribution system. For example, privacy server 120 can transmit the selected top ranked bid that is still eligible for display at user device 106 to DCDS 110.

The method continues with step 12, performed by the content distribution system. In step 12, the content distribution system transmits data to the user device that facilitates display of the content item associated with the selected top ranked bid provided by the privacy server at the user device. For example, DCDS 110 transmits data to user device 106 that facilitates display of the content item associated with the selected top ranked bid provided by privacy server 120 at user device 106 in browser 107.

In some implementations, there can be a hierarchical application of frequency capping where different levels of the content distribution system can apply frequency capping. For example, frequency control can be applied at a group level, at a campaign level, and at a campaign group level. In some implementations, when a particular content item is display at a user device, the content item script instructs the browser to update the frequency count at all applicable levels. In some implementations, a content item request bloom filter can encompass all groups, campaigns, and campaign groups that have reached the frequency cap as ineligible.

In some implementations, there can be a category-wide application of frequency control rules. There can be an industry-wide taxonomy with a natural hierarchy that matches users' expectations in particular industries. When a user indicates disinterest in one content item from one content provider, the browser can encode the user frequency control feedback in the bloom filter embedded in content item requests provided to the content distribution system. For example, if a user indicates that they do not want to see any more content items related to birds, all content providers can be stopped from providing content items related to albatrosses to the browser of the particular user. Thus, the innovative process described herein reduces resources used to provide content to a user who is unlikely to engage or whose user experience may be diminished.

The innovative techniques for user data collection and analysis offers various options to achieve the desirable level of privacy protection with minimal impact to content providers and content distribution systems. Furthermore, the efficient nature of the process imposes a reasonable adoption cost for the industry. The techniques are adaptable to the privacy preferences of a user and the distribution preferences of a content provider. For example, in one particular implementation a browser can (1) determine when and how to randomly expand the set of content items that are ineligible to be served and/or the size of the set, (2) choose an appropriate bloom filter algorithm and false positive rate for the bloom filter, again randomly expanding the set of content items that are ineligible to be served, and (3) choose whether to adopt an independent privacy server, such as privacy server 120, to further obfuscate the set of content items ineligible to be served, further protecting user privacy.

Figure 3:
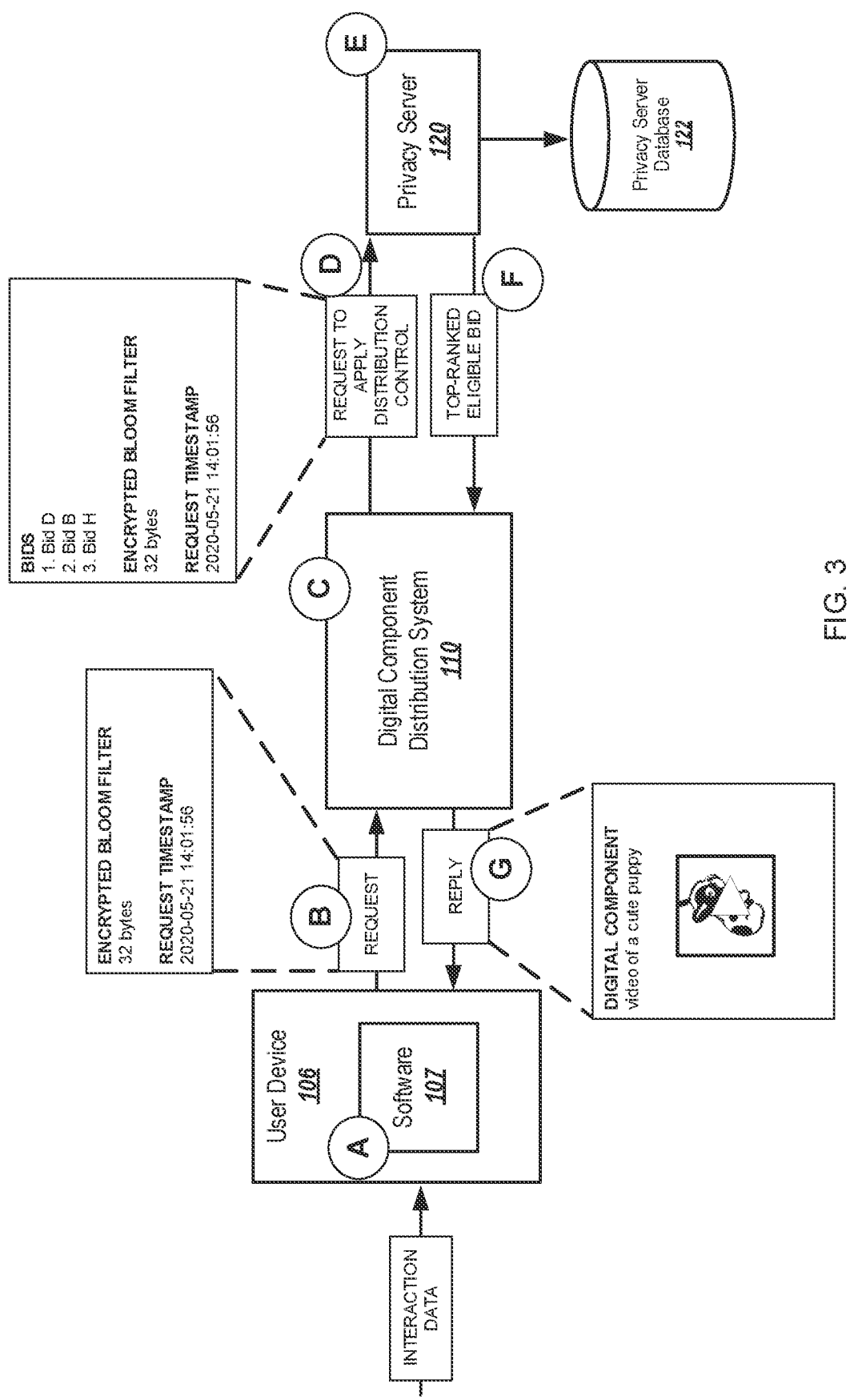
FIG. 3 depicts a data flow of a privacy preserving method for data collection and analysis.

FIG. 3 depicts a data flow 300 of a privacy preserving method for data collection and analysis in the example environment of FIG. 1. Operations of data flow 300 are performed by various components of the system 100. For example, operations of data flow 200 can be performed by DCDS 110 and privacy server 120 in communication with user devices 106.

The flow begins with step A, in which user device 106 receives interaction data indicating that an interaction performed by the user of user device 106 and triggering a request for a content item. For example, user device 106 can receive interaction notification from browser 107 that the user has clicked on a web page that provides content relating to baby animals.

The flow continues with step B, in which browser 107 generates a request for content and provides the request to DCDS 110. For example, browser 107 can generate request 108 for content to be displayed at user device 106. Browser 107 can also generate, based on frequency control rules for the user of user device 106 and the web page, a bloom filter and encrypt the bloom filter using a private key for privacy server 120 as described above. For example, browser 107 can select a type of bloom filter, select a false positive rate for the bloom filter, and construct the bloom filter. Browser 107 also records a timestamp indicating the time at which the content item request was generated. Browser 107 can transmit a message including the encrypted bloom filter and the timestamp along with the request 108 for content to DCDS 110.

The flow continues with step C, in which DCDS 110 performs a content item auction process to solicit and receive bids for the provision of content at user device 106 in response to the request for content item. For example, DCDS 110 can perform steps 4-6 as described above with respect to FIG. 2.

The flow continues with step D, in which DCDS 110 requests application of frequency control rules to the top bid responses selected from the auction process. For example, DCDS 110 can transmit a request to apply frequency control to privacy server 120. The request includes a list of the top ranked bids, the encrypted bloom filter, and the timestamp. For example, the list can include the top 3 ranked bids.

The flow continues with step E, in which DCDS 110 applies frequency control rules to the list of top ranked bids. For example, DCDS 110 can decrypt, using its private key, the encrypted bloom filter that was encrypted by browser 107 using DCDS 110's public key. DCDS 110 can then apply frequency control to the list of top ranked bids. In some implementations, privacy server 120 performs step E. Privacy server 120 can be separate from DCDS 110. In some implementations, privacy server 120 is part of DCDS 110 and ensures that DCDS 110 does not query the same bloom filter repeatedly to gather more information than needed to perform content distribution.

The flow continues with step F, in which privacy server 120 selects, from among the remaining bids that were not determined to be ineligible, the highest bid and returns the bid to DCDS 110. For example, privacy server 120 can identify, from among two bids that were not determined to be ineligible based on a query of a bloom filter, the highest bid and return the bid to DCDS 110.

The flow concludes with step G, in which DCDS 110 transmits data facilitating display of the content item associated with the bid identified by privacy server 120 at user device 106. For example, DCDS 110 can transmit a reply 114 to user device 106's request 108. Reply 114 includes the data that facilitates display of the content item associated with the bid identified by privacy server 120 at user device 106. For example, the content item can be a digital component that is a video of a cute puppy to be displayed in browser 107 where the user of user device 106 was viewing a web page related to baby animals.

Figure 4:
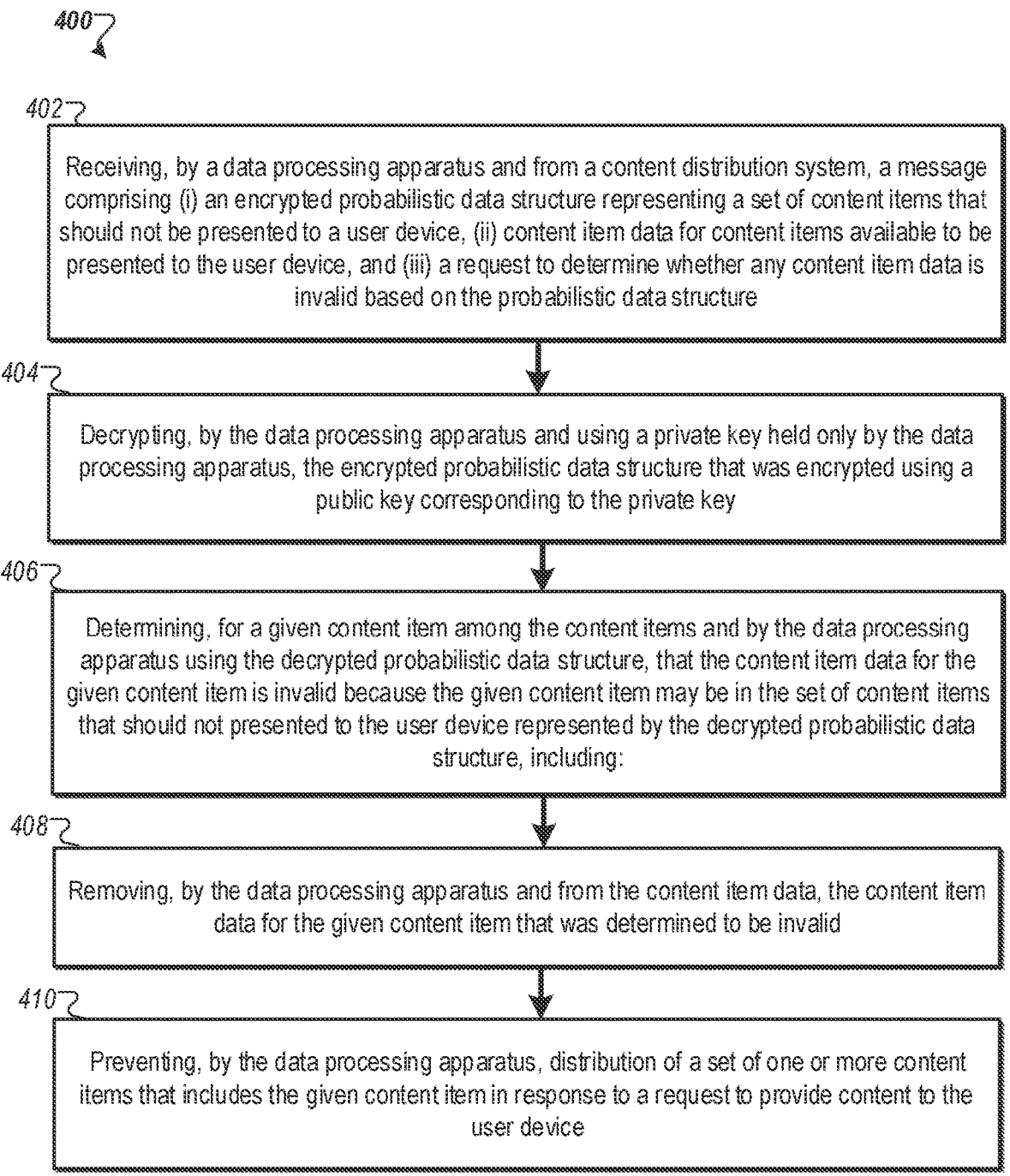
FIG. 4 is a flow diagram of an example process of privacy preserving process for data collection and analysis using a space-efficient probabilistic data structure.

FIG. 4 is a flow diagram of an example process of privacy preserving process for data collection and analysis using a space-efficient probabilistic data structure. In some implementations, process 400 can be performed by one or more systems. For example, process 400 can be implemented by DCDS 110, privacy server 120, and/or user device(s) 106 of FIGS. 1-3. In some implementations, the process 400 can be implemented as instructions stored on a non-transitory computer readable medium, and when the instructions are executed by one or more servers, the instructions can cause the one or more servers to perform operations of the process 400.

Process 400 begins with receiving, by a data processing apparatus and from a content distribution system, a message comprising (i) an encrypted probabilistic data structure representing a set of content items that should not be provided to a user device, (ii) content item data for content items available to be provided to the user device, and (iii) a request to determine whether any content item data is invalid based on the probabilistic data structure (402). For example, privacy server 120 can receive, from DCDS 110, a message that includes an encrypted bloom filter, a set of bids, and a request to apply frequency control to the content distribution process by determining whether the bids in the set correspond to content items that are frequency capped or have been muted by a user.

In some implementations, the message includes a timestamp of when the content request was made. For example, the message can include a timestamp of when browser 107 generated the request for content 108.

In some implementations, the set of content items that should not be provided to a user device represented by the bloom filter includes the union of (1) a first set of content items that should not be provided to a user device and (2) a second set of content items that were randomly selected. For example, the set D of content items that should not be provided to a user device 106 can include content items that are (1) frequency capped or have been muted by a user and (2) randomly selected to add noise.

In some implementations, as described above, the bloom filter is specific to the user device, to a web page, or a request to provide content to the user device. In some implementations, the bloom filter is specific to the browser or OS of the user device.

Each content item bid in the set of content item can identify a content item using a globally unique identifier generated using a cryptographic hash function based on the domain of the content provider, the content item identifier unique within each content provider, the content provider's secret key, the browser's public key generated by trust token, or a subset of the above information. For example, each content item bid can include a globally unique campaign ID for the content item associated with the bid, where the globally unique campaign ID was generated using HMAC SHA-256 based on the domain of the content provider and the content item identifier unique to the content provider.

Process 400 continues with decrypting, by the data processing apparatus and using a private key held only by the data processing apparatus, the encrypted probabilistic data structure that was encrypted using a public key corresponding to the private key (404). For example, privacy server 120 can decrypt the encrypted bloom filter using its private key if the encrypted bloom filter was encrypted using privacy server 120's public key.

Process 400 continues with determining, for a given content item among the content items and by the data processing apparatus using the decrypted probabilistic data structure, that the content item data for the given content item is invalid because the given content item may be in the set of content items that should not be provided to the user device represented by the decrypted probabilistic data structure (406). For example, privacy server 120 can determine, based on the bloom filter and querying privacy server database 122, that a content item bid in the list of top ranked bids is associated with a content item that is ineligible for display at user device 106 because the content item may be in the set represented by the bloom filter.

In some implementations, determining that the content item data for the given content item is invalid because the given content item may be in the set of content items that should not be provided to the user device represented by the decrypted probabilistic data structure further includes querying, by the data processing apparatus and using a bloom filter or other probabilistic, an encrypted database that is accessible exclusively by the data processing apparatus, and the data processing apparatus is a server independent from the content distribution system and content providers that provide (i) the set of content items that should not be provided to a user device and (ii) the content items available to be provided to the user device.

In some implementations, determining that the content item bid is invalid includes determining, based on the timestamp, that the bloom filter is stale. For example, privacy server 120 can determine, based on the timestamp, that the bloom filter is stale, or based on the previous query records in privacy server database 122, that the content distribution system has queried the same bloom filter excessively. Privacy server 120 can then determine that the content item is ineligible for provision to the user.

Process 400 continues with removing, by the data processing apparatus and from the content item data, the content item data for the given content item that was determined to be invalid (408). For example, privacy server 120 can remove a bid for a content item that was determined to be ineligible for provision to the user of user device 106.

Process 400 concludes with preventing, by the data processing apparatus, distribution of a set of one or more content items that includes the given content item in response to a request to provide content to the user device (410). For example, privacy server 120 selects a content item bid as the winning bid only if the content item associated with the bid was not determined to be ineligible. Thus, privacy server 120 prevents distribution of any content items that were determined to be ineligible because of frequency capping, muting by a user, random noise, or bloom filter false positives. In some implementations, preventing distribution of a set of content includes refraining from providing a specified type of content to the user. In some implementations, preventing distribution of a set of content items includes refraining from providing content items having a specified type of content to the user, and each content item within the set of content items is provided by a different content provider, such that content items having a common type from different content providers can each be prevented from being distributed to a user. For example, if privacy server 120 determines that a content item related to snack food is ineligible for provision to a user because of frequency capping, privacy server 120 can prevent other content items related to other snack foods from being provided to the user of user device 106 because more content items related to snack food may be annoying to the user and the user may not interact with or even view the content.

Figure 5:
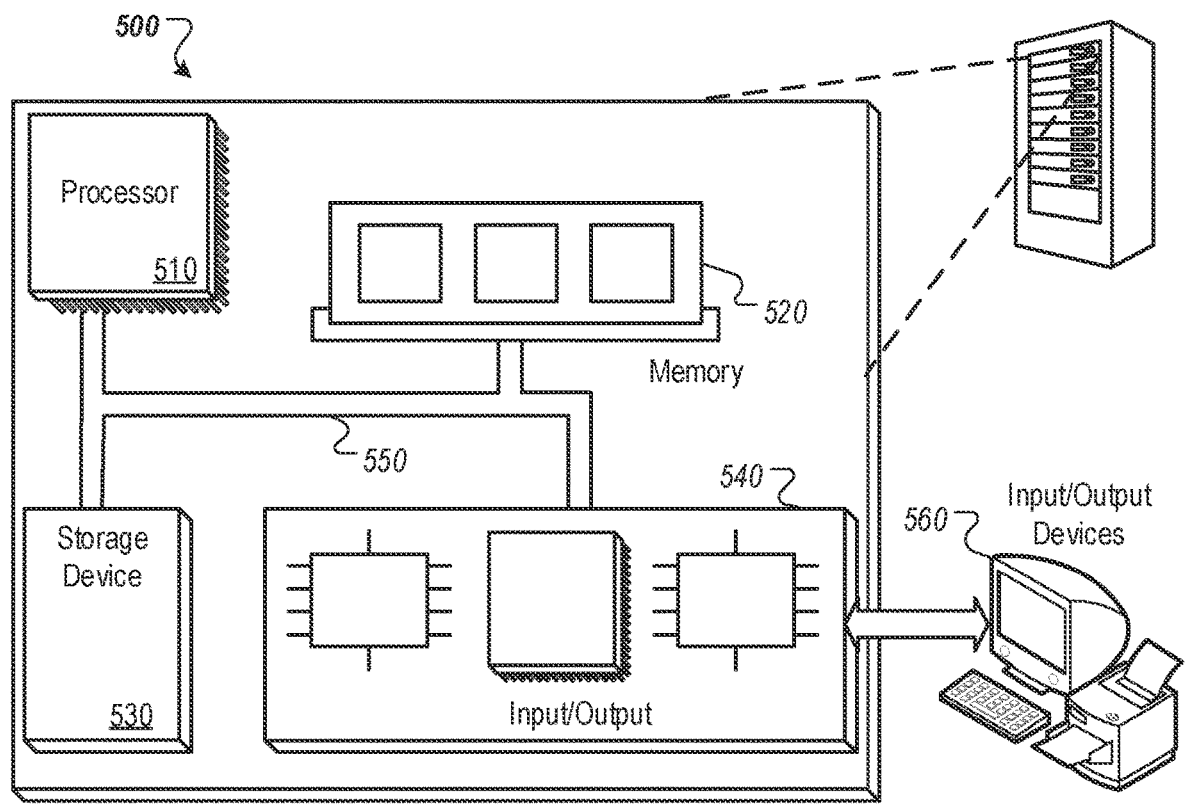
FIG. 5 is a block diagram of an example computer system.

FIG. 5 is block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Media does not necessarily correspond to a file. Media may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method, comprising:
  receiving, by a data processing apparatus and from a content distribution system, a message comprising (i) a probabilistic data structure representing a set of content items that should not be provided to a user device, (ii) content item data for content items available to be provided to the user device, and (iii) a request to determine whether any content item data is invalid based on the probabilistic data structure;
  querying, by the data processing apparatus, the probabilistic data structure to determine whether the probabilistic data structure encodes an identifier for a given content item among the content items;
  determining, by the data processing apparatus using based on querying the probabilistic data structure, that the content item data for the given content item is invalid because the probabilistic data structure encodes the identifier for the given content item; and
  in response to determining that the content item data for the given content item is invalid, removing, by the data processing apparatus and from the content item data, the content item data for the given content item that was determined to be invalid; and preventing, by the data processing apparatus, distribution of the given content item in response to a request to provide content to the user device.

2. The method of claim 1, wherein
the data processing apparatus is a server independent from the content distribution system and content providers that provide (i) the set of content items that should not be provided to a user device and (ii) the content items available to be provided to the user device.

3. The method of claim 1, wherein the probabilistic data structure is encrypted, the method further comprising:
decrypting, by the data processing apparatus and using a private key held only by the data processing apparatus, the encrypted probabilistic data structure to obtain the probabilistic data structure,
wherein the probabilistic data structure was encrypted using a public key corresponding to the private key to create the encrypted probabilistic data structure.

4. The method of claim 1, wherein the probabilistic data structure is a bloom filter that is specific to one of: the user device, a web page, a publisher's website, or a request to provide content to the user device.

5. The method of claim 1, wherein the set of content items represented by the probabilistic data structure comprises a union of (1) a first set of content items that should not be provided to a user device and (2) a second set of content items that were randomly selected.

6. The method of claim 1, wherein preventing distribution of a set of content items comprises refraining from providing content items having a specified type of content to the user.

7. The method of claim 1, wherein the content item data for each of the content items comprises a globally unique identifier generated using a hash function based on at least one of: a domain of the content provider, the content item identifier unique within each content provider, the content provider's secret key, the browser's public key generated by trust token.

8. The method of claim 1, comprising:
transmitting, by the data processing apparatus and to the user device, data that facilitates display of a first content item, the first content item comprising a content item script that instructs a browser of the user device to update a frequency count for one or more content items including the first content item, wherein the set of content items represented by the probabilistic data structure comprises a plurality of content items of multiple content providers that are frequency capped or have been muted by a user of the user device;
obtaining, from a plurality of content providers, responses indicating particular content items, wherein at least one particular content item is the first content item;
determining, by the data processing apparatus and using the probabilistic data structure, that the first content item is invalid because the first content item is in the set of content items that should not be provided to the user device represented by the probabilistic data structure;
in response to determining that the first content item is invalid, preventing, by the data processing apparatus, each of the plurality of content providers from distributing the first content item to the user device by removing content item data for the first content item from content item data for content items that are available to be provided to the user device;
selecting, by the data processing apparatus and using the content item data for the content items that are available to be provided to the user device, a second content item that is still eligible after the content item data for the first content item has been removed; and
transmitting, by the data processing apparatus, the second content item to the user device.

9. A system comprising:
one or more processors; and
one or more memory elements including instructions that, when executed, cause the one or more processors to perform operations including:
receiving, by the one or more processors and from a content distribution system, a message comprising (i) a probabilistic data structure representing a set of content items that should not be provided to a user device, (ii) content item data for content items available to be provided to the user device, and (iii) a request to determine whether any content item data is invalid based on the probabilistic data structure;
querying, by the one or more processors, the probabilistic data structure to determine whether the probabilistic data structure encodes an identifier for a given content item among the content items;
determining, by the one or more processors using based on querying the probabilistic data structure, that the content item data for the given content item is invalid because the probabilistic data structure encodes the identifier for the given content item; and
in response to determining that the content item data for the given content item is invalid, removing, by the one or more processors and from the content item data, the content item data for the given content item that was determined to be invalid; and
preventing, by the one or more processors, distribution of the given content item in response to a request to provide content to the user device.

10. The system of claim 9, wherein
the one or more processors are a server independent from the content distribution system and content providers that provide (i) the set of content items that should not be provided to a user device and (ii) the content items available to be provided to the user device.

11. The system of claim 9, wherein the probabilistic data structure is encrypted and the operations comprise:
decrypting, by the data processing apparatus and using a private key held only by the data processing apparatus, the encrypted probabilistic data structure to obtain the probabilistic data structure,
wherein the probabilistic data structure was encrypted using a public key corresponding to the private key to create the encrypted probabilistic data structure.

12. The system of claim 9, wherein the probabilistic data structure is a bloom filter that is specific to one of: the user device, a web page, a publisher's website, or a request to provide content to the user device.

13. The system of claim 9, wherein the set of content items that should not be provided to a user device represented by the probabilistic data structure comprises a union of (1) a first set of content items that should not be provided to a user device and (2) a second set of content items that were randomly selected.

14. The system of claim 9, wherein preventing distribution of a set of content items comprises refraining from providing content items having a specified type of content to the user.

15. The system of any of claim 9, wherein the content item data for each of the content items comprises a globally unique identifier generated using a hash function based on at least one of: a domain of the content provider, the content item identifier unique within each content provider, the content provider's secret key, the browser's public key generated by trust token.

16. A non-transitory computer storage medium encoded with instructions that when executed by a distributed computing system cause the distributed computing system to perform operations comprising:
    receiving, by one or more processors and from a content distribution system, a message comprising (i) a probabilistic data structure representing a set of content items that should not be provided to a user device, (ii) content item data for content items available to be provided to the user device, and (iii) a request to determine whether any content item data is invalid based on the probabilistic data structure;
    querying, by the one or more processors, the probabilistic data structure to determine whether the probabilistic data structure encodes an identifier for a given content item among the content items;
    determining, by the one or more processors based on querying the probabilistic data structure, that the content item data for the given content item is invalid because the probabilistic data structure encodes the identifier for the given content item; and
    in response to determining that the content item data for the given content item is invalid, removing, by the one or more processors and from the content item data, the content item data for the given content item that was determined to be invalid; and
    preventing, by the one or more processors, distribution of the given content item in response to a request to provide content to the user device.

17. The non-transitory computer storage medium of claim 16, wherein
    the one or more processors are a server independent from the content distribution system and content providers that provide (i) the set of content items that should not be provided to a user device and (ii) the content items available to be provided to the user device.

18. The non-transitory computer storage medium of claim 16, wherein the probabilistic data structure is encrypted and the operations comprise:
    decrypting, by the data processing apparatus and using a private key held only by the data processing apparatus, the encrypted probabilistic data structure to obtain the probabilistic data structure,
    wherein the probabilistic data structure was encrypted using a public key corresponding to the private key to create the encrypted probabilistic data structure.

19. The non-transitory computer storage medium of claim 16, wherein the probabilistic data structure is a bloom filter that is specific to one of: the user device, a web page, a publisher's website, or a request to provide content to the user device.

20. The non-transitory computer storage medium of claim 16, wherein the set of content items that should not be provided to a user device represented by the probabilistic data structure comprises a union of (1) a first set of content items that should not be provided to a user device and (2) a second set of content items that were randomly selected.

* * * * *